Feb. 17, 1948. H. J. OGORZALY ET AL 2,436,225
APPARATUS FOR CONTACTING SOLIDS WITH GASEOUS FLUIDS
Filed Aug. 24, 1944 2 Sheets-Sheet 1
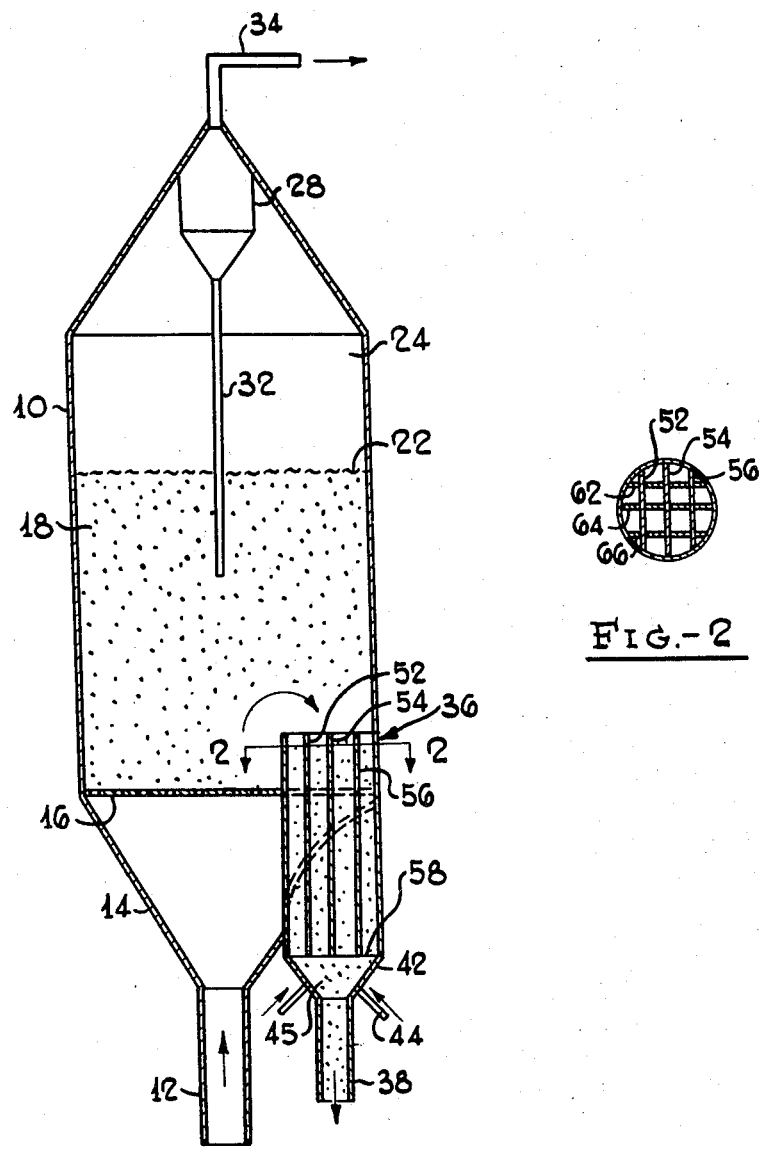
Henry J. Ogorzaly
Wilford P. Lakin Inventors
By /s/ Young Attorney Feb. 17, 1948. H. J. OGORZALY ET AL 2,436,225
APPARATUS FOR CONTACTING SOLIDS WITH GASEOUS FLUIDS
Filed Aug. 24, 1944 2 Sheets-Sheet 2
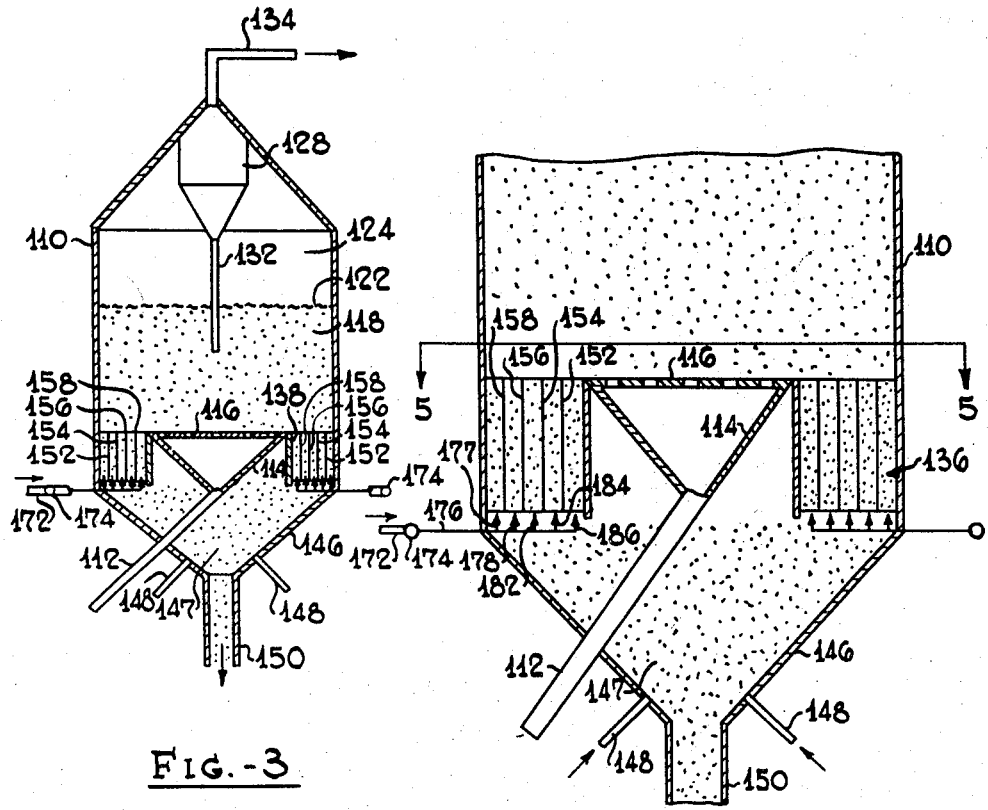
FIG.-3
FIG.-4
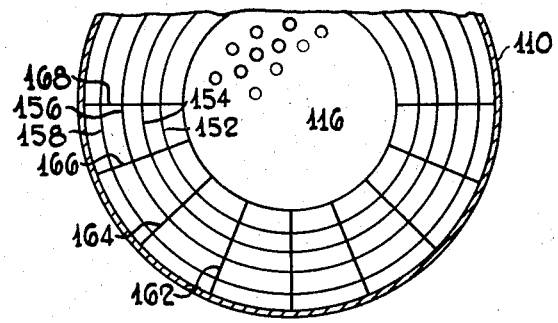
FIG.-5
Henry J. Ogorzaly
Wilford P. Lakin   Inventors
By _____ Attorney Patented Feb. 17, 1948

2,436,225

UNITED STATES PATENT OFFICE 2,436,225

APPARATUS FOR CONTACTING SOLIDS WITH GASEOUS FLUIDS

Henry J. Ogorzaly, Summit, and Wilford P. Lakin, Elizabeth, N. J., assignors to Standard Oil Development Company, a corporation of Delaware Application August 24, 1944, Serial No. 551,028

2 Claims. (Cl. 196—52)

This invention relates to contacting subdivided solid particles with gaseous fluid, and more particularly, relates to stripping or purging of fluidized subdivided solids in a dense fluidized liquid-simulating condition following a contacting step, such as a chemical reaction, to remove material entrained or present in vaporous form.

More particularly, the invention relates to stripping or purging combustible vapors from spent or contaminated catalyst or contact particles containing combustible or carbonaceous material deposited thereon during a hydrocarbon cracking or conversion operation in a cracking or conversion zone. Our invention is adapted for use with other processes where subdivided solids carry with them materials which can be removed by stripping.

In the catalytic cracking of hydrocarbons, coke or carbonaceous material is deposited on the catalyst particles and it is necessary to regenerate the particles as by burning with air to remove the coke or contaminant before using the catalyst over again in another conversion operation. It is desirable to purge the catalyst particles of entrained hydrocarbon vapors and readily volatilized adsorbed materials before proceeding to burn off the coke. If all of the strippable material is not removed in the stripping zone and some of the material goes along with the spent catalyst to the regeneration zone where it is burned with the coke or carbonaceous deposits, a loss of potential product is incurred and at the same time an unnecessary burden is placed on the regeneration capacity.

According to our invention, we obtain a high degree of stripping efficiency with a minimum amount of stripping volume and especially height, and with a minimum amount of stripping or purge gas. We have found that the effectiveness of stripping is improved by increasing the density of the fluidized catalyst stream entering the stripping zone. We have also found that by decreasing the effective diameter of the stripping zone expressed in relation to its length, improved stripping may be obtained. We have further found that constriction of the stripping gas cross-section toward the minimum compatible with maintaining continuous and even downward flow of catalyst against the rising stream of stripping gas is advantageous in improving efficiency of stripping.

In the drawings;

Fig. 1 represents a vertical longitudinal cross-section of one form of reaction vessel which may be used in practicing our invention;

Fig. 2 represents a horizontal cross-section of the stripping zone taken on line 2—2 of Fig. 1;

Fig. 3 represents a vertical longitudinal cross-section of a preferred form of reaction vessel;

Fig. 4 represents an enlarged detailed view of the bottom portion of the reaction vessel shown in Fig. 3; and Fig. 5 represents a horizontal transverse cross-section taken substantially on line 5—5 of Fig. 4.

Referring now to Fig. 1 of the drawing which shows one form of apparatus which may be used for carrying out our invention, the reference character 10 designates a reaction vessel having an inlet 12 through which a suspension of solid catalyst or contact particles and reactants is passed. Our invention will be specifically described in connection with the catalytic cracking of hydrocarbons but it is to be understood that this is by way of example only and that our invention may be used with other processes where it is desired to remove strippable material from subdivided solids.

In the catalytic cracking of hydrocarbons, liquid hydrocarbons or hydrocarbon vapors are mixed with hot regenerated catalyst or contact particles and this mixture is passed through line 12 into the conical bottom 14 below a distribution plate 16 arranged in the bottom portion of the reaction vessel 10. Where liquid hydrocarbon oil is used as a feed stock, a sufficient amount of catalyst or contact particles at an elevated temperature of about 1100° F. is mixed with the oil to vaporize it and to supply the heat of cracking.

The velocity of the upflowing vapors is so selected that the catalyst or contact particles assume the appearance of a liquid. The solid particles are maintained in a dry fluidized mixture or bed shown at 18 with a level indicated at 22. Above the level 22 is a dilute phase 24 in which there is only a small amount of catalyst suspended in the vaporous reaction products passing upwardly through the reaction vessel 10.

The vaporous reaction products containing a small amount of entrained catalyst particles are passed through separating means 28 arranged in the upper part of the reaction vessel 10 for separating most of the entrained catalyst particles from the vaporous reaction products. The separated catalyst particles are collected in the separating means 28 and are returned to the bed or mixture 18 through line 32 which dips below the level 22 in the reaction vessel 10. The vaporous reaction products pass overhead through line 34 to a fractionating apparatus or other apparatus for recovering desired products.

The separating means 28 is shown in the drawing as a cyclone separator but other forms of separating means may be used as, for example, a Multiclone separator.

During the catalytic cracking of hydrocarbons, coke or carbonaceous material is deposited on the catalyst particles and the particles become spent or deactivated. The spent catalysts are then sent to a regeneration zone (not shown) where the coke or carbonaceous material is burned and the hot regenerated catalyst particles are then returned to the reaction vessel 10 through line 12.

Before passing the spent or contaminated catalyst particles to the regeneration zone, it is preferred practice to pass them through a stripping or purging zone to remove entrained vapors and gases and some of the adsorbed hydrocarbon vapors and gases.

The spent or contaminated catalyst particles are withdrawn in a dense fluidized condition directly from the bed or mixture 18 and are passed through a stripping or purging zone generally indicated at 36. The stripping or purging zone is shown as arranged at one side of vessel 10 and extending slightly above and below the distribution plate 16. The stripping zone 36 is preferably cylindrical in cross-section but may take other forms and may extend as a trough across the vessel 10. The stripping zone 36 has a bottom outlet 38 external to vessel 10 which forms a standpipe for developing hydrostatic pressure for feeding the purged particles to a regenerator or other zone. Stripping gas, such as steam, is introduced into conical bottom 42 of the stripping zone 36 through lines 44.

The stripped fluidized catalyst particles are then passed to the standpipe 38 in which they are maintained in a dry liquid-like condition by introduction of aerating gas to produce a hydrostatic pressure at the base of the standpipe which is of a sufficient magnitude to move the catalyst particles to a regeneration vessel (not shown) or other vessel.

To improve stripping, we constrict the cross-sectional area of the stripping section to approach a maximum permissible catalyst flow rate and purging gas velocity while permitting even downward flow of the dense fluidized solid particles through the stripping zone or section. It has been established that for any given gas velocity upward, the rate of solid particle flow downward can be increased to a well-defined limit above which the solid particles in fluidized condition do not flow downward in a continuous manner and extremely uneven surges of pressure and of particle delivery are obtained, while below this limiting rate the particle flow is even and continuous. This critical limitation is approximately defined by the following expression:

Maximum permissible catalyst flow rate, lbs./minute/square foot=

$$\frac{1920}{V^{1.36}}$$

where $V$ represents the superficial upward velocity in feet per second of the purging or stripping gas employed. Maximum stripping efficiency is obtained by operating at the highest catalyst and gas rates possible without exceeding the limiting value approximately established by the above relationship.

While it is desirable to approach the critical conditions indicated by the above limitations for maximum stripping effectiveness, in order to avoid imposing too narrow a limit on an operating unit, it is preferred to operate at less extreme conditions, expressed by the following relationship:

Operating catalyst flow rate, lbs./minute/square foot=

$$\frac{1000}{V^{1.36}}$$

For example, if it is desired to purge 35 tons per minute of catalyst with a gas stream equivalent to 150 cubic feet per second at the conditions of operation, the required area may be solved for through the use of the above equation as follows:

$$\frac{35 \times 2000}{\text{area}} = \frac{1000}{\left(\frac{150}{\text{area}}\right)^{1.36}}$$

The required area is thus 108 square feet.

The stripping vessel or section should be designed to have a high ratio of length to effective diameter. For example, a narrow and tall vessel would be high in length over effective diameter (L/D) ratio but this is not the most satisfactory way of operating since the area necessary for handling large quantities of catalyst or contact particles in commercial cracking units without exceeding the limiting value above described makes the use of adequately long stripping vessels or sections impracticable.

According to our invention, high L/D ratios are obtained within a reasonable length of stripping zone while retaining the large cross-sectional area necessary by subdividing the area into a large number of parallel zones, each of low area and effective diameter. Preferably, vertical baffles are used to subdivide the area of the stripping vessel or section. Instead of vertical baffles, the stripping vessel or section may be charged with a packing material or filler, such as Raschig rings, hollow tile, and other similar materials, which serve to reduce the effective diameter of the paths for catalyst and gas flow. Sufficient free cross-sectional area to permit upward flow of purging gas and even downward flow of catalyst or contact particles in dry fluidized liquid-like condition must be retained.

Where cross-sections of stripping zones are not circular, as when they are in the form of rectangles or annuli, or irregularly shaped restrictions between packing materials, the usual expression for equivalent hydraulic diameter (4 times the area divided by the perimeter) may be employed as representing the effective diameter for stripping.

Also, it is desirable during stripping to operate with minimum entrainment of gas from the reaction zone to the stripping zone for the purpose of reducing the quantity of purging gas required to reduce the amount of entrained reaction gases carried into the regeneration zone to a tolerable level. This can be achieved by use of coarse catalyst which has a relatively higher bulk density than catalyst of high fines content, that is, it entrains less gas volume per weight unit of catalyst circulated in the system. It may also be achieved by preliminary settling of the catalyst leaving the reaction zone before the catalyst enters the stripping section or zone but the settling should be done with as little holding time as possible to avoid excessive carbon deposition on the catalyst being settled. One method of determining the volume of gas entrained will be given hereinafter.

Referring now again to Fig. 1 of the drawing and also to Fig. 2, it will be seen that the stripping zone or section 36 is subdivided into a plurality of parallel stripping sections by vertical baffles or partitions 52, 54 and 56. Each baffle extends from the top of the stripping section 36 to a point 58 near the bottom of the stripping section 36. The stripping zone or section 36 is then further subdivided by transverse plates or baffles 62, 64 and 66, etc., which are of substantially the same length as baffles 52, 54 and 56.

Stripping or purging gas may be introduced by individual injection points into the bottom of each cell formed by the baffles. Alternatively, stripping gas may be introduced into the bottom cone of the stripper as by line 44 and distributed into the separate cells by the dispersing action of the dense catalyst bed 45.

While we have shown a certain number of baffles in the drawing, it is to be understood that these are by way of example only and the number of such baffles may be changed while still obtaining the benefits of our invention. By subdividing the stripping zone into a plurality of smaller sections, a zone of low ratio of length to effective diameter is changed to a plurality of sections, each with high ratio of length to effective diameter.

Referring now to Figs. 3, 4 and 5 of the drawing which show a preferred form of apparatus for carrying out our invention, the reference character 110 designates a reaction vessel having an inlet 112 through which a suspension of solid catalyst or contact particles and reactants is passed.

In the catalytic cracking of hydrocarbons, liquid hydrocarbons or hydrocarbon vapors are mixed with hot regenerated catalyst or contact particles and this mixture is passed through line 112 into the inlet cone 114 provided with a distribution plate 116 in its upper portion. The inlet cone and the distribution plate are arranged in the bottom portion of the reaction vessel 110. Where liquid hydrocarbon oil is used as a feed stock, a sufficient amount of catalyst or contact particles at an elevated temperature of about 1100° F. is mixed with the oil to vaporize it and to supply the heat of cracking.

The velocity of the upflowing vapors is so selected that the catalyst or contact particles assume the appearance of a liquid. The solid particles are maintained in a dry fluidized mixture or bed shown at 118 with a level indicated at 122. Above the level 122 is a dilute phase 124 in which there is only a small amount of catalyst suspended in the vaporous reaction products passing upwardly through the reaction vessel 110.

The vaporous reaction products containing a small amount of entrained catalyst particles are passed through separating means 128 arranged in the upper part of the reaction vessel 110 for separating most of the entrained catalyst particles from the vaporous reaction products. The separated catalyst particles are collected in the separating means 128 and are returned to the bed or mixture 118 through line 132 which dips below the level 122 in the reaction vessel 110. The vaporous reaction products pass overhead through line 134 to a fractionating apparatus or other apparatus for recovering desired products.

The separating means 128 is shown in the drawing as a cyclone separator but other forms of separating means may be used as, for example, a Multiclone separator.

During the catalytic cracking of hydrocarbons, coke or carbonaceous material is deposited on the catalyst particles and the particles become spent or deactivated. The spent catalysts are then sent to a regeneration zone (not shown) where the coke or carbonaceous material is burned and the hot regenerated catalyst particles are then returned to the reaction vessel 110 through line 112. Before passing the spent or contaminated catalyst particles to the regeneration zone, it is desirable to pass them through a stripping or purging zone to remove entrained vapors and gases and some of the adsorbed hydrocarbon vapors and gases.

The spent or contaminated catalyst particles are withdrawn in a dense fluidized condition from the bottom of the bed or mixture 118 and are passed through a stripping or purging zone generally indicated at 136. The stripping or purging zone is arranged below the distribution plate 116. The inlet cone 114 is provided with a cylindrical shell 138 which depends from the distribution plate 116 and which forms one wall of the stripping or purging zone 136. The stripping or purging zone will be hereinafter described in greater detail.

The stripped catalyst or contact particles still in a dense fluidized condition are passed to the bottom cone or funnel-shaped bottom 146 of the reaction vessel 110 wherein they are maintained in a fluidized condition as shown at 147 by the introduction of fluidizing gas through lines 148. The stripped fluidized catalyst particles are then passed to a standpipe 150 in which they are maintained in a liquid-like condition to produce a hydrostatic pressure at the base of the standpipe which is of a sufficient magnitude to move the catalyst particles to a regeneration vessel (not shown).

According to our invention, the stripping section generally indicated at 136 in this form of the invention is subdivided into a plurality of annular sections by vertical concentric walls 152, 154, 156 and 158. The stripping zone or section 136 is then further subdivided by transverse plates or baffles 162, 164, 166, 168, etc., which extend from the cylindrical shell 138 to the wall of the vessel 110 forming the outer wall of the stripping section 136.

Stripping gas, such as steam, is introduced into the bottom portion of the stripping section through line 172 which preferably feeds into an annular manifold 174. The stripping gas then passes from the manifold 174 through a plurality of lines, one of which is shown at 176. Line 176 is provided with a plurality of nozzles or injectors 177, 178, 182, 184 and 186 for introducing stripping or purging gas into the bottom of each cell formed by the annular baffles and the transverse baffles. Preferably stripping gas is introduced into the bottom of each cell but a smaller number of injection points may be used as, for example, one nozzle may be used for feeding two adjacent cells or four adjacent cells.

While we have shown a certain number of annular and transverse baffles in this form of our invention, it is to be understood that these are by way of example only and the number of such baffles may be changed and still obtain the benefits of our invention. By subdividing the annular stripping zone into a plurality of smaller sections, a high ratio of length to effective diameter is obtained in each stripping section. Instead of using baffles to form the plurality of paths through the stripping zone, other packing or contact means may be employed, sufficient free space being provided to permit even downflow of catalyst or contact particles and upflow of stripping gas at the desired rates.

Illustrative data indicating these effects are as follows:

(a) To show the advantages of constriction, two strippers with the same geometric configuration (ratio of length to diameter) but of different cross-sectional area were tested when purging a fixed quantity of catalyst with a fixed quantity of stripping gas. The results are tabulated below:

| Stripper | 1 | 2 |
|---|---|---|
| Length, ft | 8 | 4 |
| Diameter, ft | 1.0 | 0.5 |
| L/D ratio | 8.0 | --- |
| Catalyst rate, lbs./min | 200 | --- |
| Stripping gas rate, cu. ft./hr. at conditions given | 1,200 | --- |
| Stripping efficiency, per cent | 90 | 96 |

The stripper of lower cross-sectional area gave improved purging when processing the same quantity of catalyst with the same quantity of gas.

(b) To show the advantages of increased ratio of length to diameter, other comparisons were made among vessels operating at the same catalyst and gas rates per unit of cross-sectional area, but with length to diameter ratio varied by modifying first the diameter and then the height as follows:

| Stripper | 3 | 4 | 5 |
|---|---|---|---|
| Length, ft | 8 | 8 | 4 |
| Diameter, ft | 1.0 | 0.5 | 0.5 |
| L/D ratio | 8 | 16 | 8 |
| Catalyst rate, lbs./min./sq. ft | --- | 1,130 | --- |
| Stripping gas rate, cu. ft./hr./sq. ft | --- | 2,040 | --- |
| Stripping efficiency, per cent | 77 | 91 | 77 |

Thus the stripping effectiveness was considerably improved by decreasing the diameter and thereby increasing the length to diameter ratio, and then subsequently returned to its original level by reducing the length proportionately in order to duplicate the original length to diameter ratio, at fixed rates of catalyst and gas flow per unit of cross section.

(c) To show the advantages of operating with high density of catalyst entering the stripping zone, the following comparison was made of runs in the same stripping vessel:

| Catalyst rate lbs./min | 300 | --- |
|---|---|---|
| Inlet cat. density, lbs./cu. ft | 33 | 21 |
| Entrained gas, cu. ft./min | 6.9 | 12.1 |
| Stripping gas, cu. ft./hr | 850 | --- |
| Stripping efficiency, per cent | 91 | 86 |

This comparison indicates that a greater degree of purging is accomplished on the gas entrained with the more dense catalyst.

Additionally, a much smaller quantity of gas is entrained with the denser catalyst, so that the amount of carry-over of entrained material is decreased both by the reduction in quantity of entrained gas entering the stripper and by the increased efficiency with which the smaller quantity is purged.

The volume of entrained gas in a catalytic cracking operation using powdered catalysts, such as silica alumina gel having a size between about 200 and 400 standard mesh, is obtained, for example, by obtaining the density of the fluidized mixture in the reaction zone and dividing the weight of one cubic foot of fluidized mixture by the density of the catalyst skeleton. This gives the cubic feet of solid and subtracting from 1.0 gives the total associated gas. More specifically, with a density of the fluidized powdered silica-alumina gel catalyst of 15 lbs./cu. ft. and with a catalyst skeleton or solid density of 140 lbs./cu. ft., 15 lbs. divided by 140 lbs./cu. ft. equals 0.11 cu. ft. of solid or skeleton catalyst. The remaining volume of a cubic foot or 1.00−0.11 equals 0.89 cubic foot of total associated or entrained gas. In this way, the volume of entrained gas can be calculated, knowing the rate of flow of the catalyst.

It was above pointed out that it was preferred to settle the fluidized mixture to a higher density before stripping so that less purging would be required. If the fluidized mixture of 15 lbs./cu. ft. above described is allowed to settle to about 25 lbs./cu. ft., less purging gas is required because there is less entrained gas. At least one volume of purging gas per volume of entrained gas must be employed if complete purging is to be approached.

Using 0.89 cu. ft. per 15 lbs. of catalyst and figuring the volume of entrained gas (0.89 divided by 15) equals 5.94 cubic feet of entrained gas per 100 lbs. of catalyst. For the denser catalyst, 25 lbs. divided by 140 lbs./cu. ft. equals 0.18 cubic foot of catalyst per 25 lbs. of catalyst and 0.82 cu. ft. of entrained gas. Then 0.82 divided by 25=3.28 cu. ft. of gas per 100 lbs. of catalyst and 3.28 divided by 5.94 times 100 equals about 55% which means that for the dense material only about 55% as much purging gas is needed for the same V/V (ratio of purge gas to entrained gas).

In the catalytic cracking of hydrocarbons using a West Texas gas oil, the temperature in the reaction vessel 10 during cracking may vary between about 850° F. and 1100° F. but this temperature may be changed for other catalytic conversions of hydrocarbons. The velocity of the vapors flowing upwardly through the dense bed of mixture 18 is about 0.8 ft./second to 1.5 ft./second. The density of the mixture 18 in the reaction vessel 10 may vary between about 30 lbs./cu. ft. and 15 lbs./cu. ft. when using powdered silica alumina gel having a size between about 200 and 400 standard mesh. Higher densities of the bed or mixture 18 are obtained with the lower velocities. The catalyst to oil ratio by weight may vary between about five to one to thirty to one, preferably about fifteen to one. The time of cracking of the oil vapors is about 20 seconds at a temperature of about 950° F.

In a specific example, the catalyst to oil ratio by weight is about 20 to 1 and the strippable carbonaceous material or entrained gas or vapor in such an operation amounts to about 13% on the oil feed by weight. In such an operation, using a figure for the catalyst density of 15 lbs./cu. ft., the volume of entrained gas will be about 5.95 cubic feet per 100 lbs. of catalyst. At a feed rate of 15,000 B/D of oil, the amount of catalyst flowing through the stripping section 136 is about 31 tons per minute and the entrained gas will be about 3700 cu. ft./minute. If it is desired to establish the desirable cross-section of stripping zone when employing a ratio of purge gas to entrained gas of 2.0 equal to 7400 cubic feet per minute of purge gas, the previously given expression relating catalyst flow density to gas velocity may be used. The area is found to be 91 square feet.

In a commercial plant the stripping section is about 8 feet long with an annular stripping zone 16 inches across. Dividing this annular stripping zone into sections 12 inches wide gives an effective diameter of about 1.1 feet and an L/D of about 7.3 for each section.

The stripping gas is steam (supplied at normal transfer line temperature (350° F.)) which is quickly heated to stripping temperature (substantially equal to reaction temperature) by direct contact with the catalyst being purged.

According to our invention, the L/D ratio or length of stripping zone in effective diameters should be not less than about 4, preferably from 6 to 20, the V/V or volume of stripping gas per volume of entrained gas should not be less than 1.0, preferably 1.0 to 5 and the stripping gas velocity in feet per second should be between about 0.1 to 1.5, preferably 0.3 to 1.0.

In addition to increases in length or decreases in superficial diameter of the stripping zone, and to the insertion of vertical baffles or subdivisions or horizontal subdivisions or baffles, all for the purpose of increasing the length-to-effective diameter ratio, the use of many types of fillers or packing is entirely suitable for achieving the same result. Such fillers or packing material may be vertical or horizontal bars and angle irons, subway-type grating substantially shown in Fig. 3, spherical balls or other packing material, and the like. The use of such fillers is limited only by the necessity of achieving even downward flow of catalyst and upward flow of the desired amount of stripping gas through the restrictions introduced.

While we have shown a preferred form and another form of our invention, and have given a specific example of one operation, it is to be understood that these are by way of illustration only and various changes and modifications may be made without departing from the spirit of our invention.

What is claimed is:

1. An apparatus of the character described including a cylindrical vessel provided in its lower central portion with a circular perforated inlet member spaced from the wall of said vessel, a cylindrical baffle depending from the periphery of said inlet member and forming with the wall of said vessel an annular stripping chamber, said stripping chamber being subdivided into a large number of vertical parallel cells by intersecting vertical partitions to form a cellular structure similar to a honeycomb.

2. An apparatus defined by claim 1 wherein the vertical parallel cells are characterized by a ratio of length to effective diameter of at least 4.

HENRY J. OGORZALY.
WILFORD P. LAKIN.

REFERENCES CITED

The following references are of record in the file of this patent:

UNITED STATES PATENTS

| Number | Name | Date |
|---|---|---|
| 1,934,023 | Wright | Nov. 7, 1933 |
| 2,270,903 | Rudbach | Jan. 27, 1942 |
| 2,304,128 | Thomas | Dec. 8, 1942 |
| 2,326,705 | Thiele et al. | Aug. 10, 1943 |
| 2,336,378 | Uhlig | Dec. 7, 1943 |
| 2,337,684 | Scheineman | Dec. 28, 1943 |
| 2,341,193 | Scheineman | Feb. 8, 1944 |
| 2,347,682 | Gunness | May 2, 1944 |
| 2,356,717 | Williams | Aug. 22, 1944 |
| 2,360,787 | Murphree et al. | Oct. 17, 1944 |
| 2,367,694 | Snuggs | Jan. 23, 1945 |
| 2,376,365 | Lassiat | May 22, 1945 |
| 2,384,932 | Lechthaler | Sept. 18, 1945 |
| 2,389,493 | Evans | Nov. 20, 1945 |
| 2,391,944 | Carlsmith | Jan. 1, 1946 |
| 2,394,814 | Snuggs | Feb. 12, 1946 |